United States Patent
Brummel et al.

(10) Patent No.: US 10,036,328 B2
(45) Date of Patent: Jul. 31, 2018

(54) METHOD FOR THE COMPUTERIZED CONTROL AND/OR REGULATION OF A TECHNICAL SYSTEM

(71) Applicant: SIEMENS AKTIENGESELLSCHAFT, München (DE)

(72) Inventors: Hans-Gerd Brummel, Berlin (DE); Siegmund Düll, München (DE); Jatinder P. Singh, Orlando, FL (US); Volkmar Sterzing, Neubiberg (DE); Steffen Udluft, Eichenau (DE)

(73) Assignee: Siemens Aktiengesellschaft, München (DE)

( * ) Notice: Subject to any disclaimer, the term of this patent is extended or adjusted under 35 U.S.C. 154(b) by 287 days.

(21) Appl. No.: 14/780,469

(22) PCT Filed: Jan. 22, 2014

(86) PCT No.: PCT/EP2014/051186
§ 371 (c)(1),
(2) Date: Sep. 25, 2015

(87) PCT Pub. No.: WO2014/154374
PCT Pub. Date: Oct. 2, 2014

(65) Prior Publication Data
US 2016/0040602 A1 Feb. 11, 2016

(30) Foreign Application Priority Data

Mar. 26, 2013 (DE) .................. 10 2013 205 356

(51) Int. Cl.
*G05B 13/02* (2006.01)
*F02C 9/00* (2006.01)

(52) U.S. Cl.
CPC .............. *F02C 9/00* (2013.01); *G05B 13/027* (2013.01); *G05B 13/029* (2013.01)

(58) Field of Classification Search
CPC ........... G05B 2219/33032; G05B 2219/34082; G05B 2219/42152; G05B 13/024;
(Continued)

(56) References Cited

U.S. PATENT DOCUMENTS 5,625,574 A * 4/1997 Griffiths ............. G05B 23/0229
702/183
5,706,193 A * 1/1998 Linzenkirchner .. G05B 13/0275
700/40

(Continued)

FOREIGN PATENT DOCUMENTS

CN 101689044 A 3/2010
CN 102792234 A 11/2012
(Continued)

OTHER PUBLICATIONS

Chinese Office Action for related Chinese Application No. 201480018192.7 dated Oct. 17, 2016, with English Translation.
(Continued)

*Primary Examiner* — Darrin Dunn
(74) *Attorney, Agent, or Firm* — Lempia Summerfield Katz LLC

(57) ABSTRACT

The invention concerns a method for the computerized control and/or regulation of a technical system (T). Within the context of the method according to the invention, there is implemented in a preset regulating process (CO1, CO2) an exploration rule (EP) by means of which new, as yet unknown, states (x) of the technical system (T) are started, a simulation model (SM) of the technical system (T) checking whether the actions (a2) of the exploration rule (EP) lead to sequential states (x') lying within predetermined thresh-
(Continued)

olds. Only in that case is the corresponding action (a2) performed according to the exploration rule (EP) on the technical system. The method according to the invention enables new states to be explored within the framework of the operation of a technical system, it being ensured through checking of appropriate thresholds that the exploration is carried out imperceptibly and does not lead to incorrect operation of the technical system. The method according to the invention is suitable in particular for controlling or regulating gas turbines or wind turbines.

19 Claims, 1 Drawing Sheet

(58) Field of Classification Search
CPC .. G05B 13/042; G05B 11/42; G05B 13/0285; G05B 13/04; G05B 2219/33002; G05B 23/0229; G06N 99/005; G06N 3/02; G06N 3/0445; G06N 3/10
See application file for complete search history.

(56) References Cited

U.S. PATENT DOCUMENTS

| | | | | |
|---|---|---|---|---|
| 5,751,571 A * | 5/1998 | Tresp | G05B 13/027 | 700/29 |
| 5,818,736 A * | 10/1998 | Leibold | G05B 13/0265 | 703/16 |
| 5,857,321 A * | 1/1999 | Rajamani | F02C 9/22 | 60/39.24 |
| 6,085,183 A * | 7/2000 | Horn | B22D 11/16 | 706/45 |
| 6,195,607 B1 * | 2/2001 | Rajamani | F02C 7/22 | 60/39.37 |
| 6,353,766 B1 * | 3/2002 | Weinzierl | G05B 13/042 | 700/28 |
| 6,434,436 B1 * | 8/2002 | Adamy | G05B 5/01 | 700/32 |
| 6,480,750 B2 * | 11/2002 | Junk | G05B 13/024 | 700/289 |
| 6,721,610 B2 * | 4/2004 | Gade | G05B 13/026 | 700/150 |
| 7,337,017 B2 * | 2/2008 | Dinges | G05B 19/058 | 700/18 |
| 7,962,233 B2 * | 6/2011 | Tiozzo | G05B 19/41865 | 700/100 |
| 8,055,358 B2 * | 11/2011 | Blevins | G05B 13/022 | 700/28 |
| 8,099,181 B2 * | 1/2012 | Sterzing | G05B 13/027 | 700/47 |
| 8,260,441 B2 * | 9/2012 | Scheegaß | G05B 13/027 | 700/43 |
| 8,406,978 B2 * | 3/2013 | Nomura | F02C 9/28 | 701/100 |
| 8,554,707 B2 * | 10/2013 | Schafer | G05B 13/027 | 706/20 |
| 9,043,254 B2 * | 5/2015 | Sterzing | G05B 13/048 | 703/2 |
| 9,489,619 B2 * | 11/2016 | Dull | G06N 3/08 | |
| 2003/0100974 A1 * | 5/2003 | Alvarez | G05B 19/41885 | 700/286 |
| 2004/0162705 A1 * | 8/2004 | Grieb | G05B 23/0291 | 702/185 |
| 2005/0159825 A1 * | 7/2005 | Haguet | G05B 13/024 | 700/41 |
| 2007/0113560 A1 * | 5/2007 | Steber | F23N 5/003 | 60/773 |
| 2008/0086281 A1 * | 4/2008 | Santos | F03D 7/0292 | 702/127 |
| 2008/0168092 A1 * | 7/2008 | Boggs | G05B 17/02 | |
| 2008/0294279 A1 * | 11/2008 | Tiozzo | G05B 19/41865 | 700/100 |
| 2010/0070098 A1 * | 3/2010 | Sterzing | G05B 17/02 | 700/287 |
| 2010/0094788 A1 * | 4/2010 | Schafer | G05B 13/027 | 706/20 |
| 2010/0257866 A1 * | 10/2010 | Schneegass | G05B 13/027 | 60/773 |
| 2010/0270798 A1 * | 10/2010 | Poulsen | F03D 7/0224 | 290/44 |
| 2011/0004390 A1 * | 1/2011 | Nomura | F02C 9/28 | 701/100 |
| 2011/0022193 A1 * | 1/2011 | Panaitescu | A41D 20/00 | 700/29 |
| 2013/0013543 A1 * | 1/2013 | Dull | G05B 13/027 | 706/25 |
| 2013/0090747 A1 * | 4/2013 | Grieb | G05B 13/0205 | 700/28 |
| 2013/0204812 A1 * | 8/2013 | Sterzing | G05B 13/048 | 706/12 |
| 2013/0282635 A1 * | 10/2013 | Dull | G06N 3/08 | 706/25 |
| 2014/0039656 A1 * | 2/2014 | Humpert | G05B 19/0426 | 700/97 |
| 2014/0100703 A1 * | 4/2014 | Dull | G05B 17/02 | 700/289 |
| 2014/0201118 A1 * | 7/2014 | Cleve | G06N 3/10 | 706/44 |
| 2014/0214733 A1 * | 7/2014 | Alonso | G06N 99/005 | 706/12 |
| 2015/0369214 A1 * | 12/2015 | Herbsleb | F03D 7/022 | 416/1 |

FOREIGN PATENT DOCUMENTS

| | | | |
|---|---|---|---|
| DE | 60120192 T2 | 11/2006 | |
| DE | 102007001024 A1 | 7/2008 | |
| DE | 102007001025 A1 | 7/2008 | |
| DE | 102010044494 A1 | 3/2012 | |
| DE | 102010011221 A1 | 11/2013 | |
| EP | 0519501 A2 | 12/1992 | |
| EP | 2522851 A2 | 11/2012 | |
| JP | H07182301 A | 7/1995 | |
| JP | H08505972 A | 6/1996 | |
| JP | 2005078477 A | 3/2005 | |
| JP | 2009068359 A | 4/2009 | |
| KR | 2010126773 A | 12/2010 | |
| WO | WO2011110404 A1 | 9/2011 | |
| WO | WO 2011129805 A1 * | 10/2011 | G05B 13/048 |

OTHER PUBLICATIONS

Korean Office Action for related Korean Application No. 10-2015-7030811 dated Dec. 21, 2016.
Nozari Hasan Abbasi et al., "Model-based robust fault detection and isolation of an industrial gas turbine prototype using soft computing techniques", Neurocomputing No. 91, pp. 29-47, Elsevier, www.elsevier.com/locate/neucom; 2012.
Poultangari Iman et al., "RBF neural network based PI pitch controller for a class of 5-MV wind turbines using particle swarm optimization algorithm", ISA Transactions No. 51, 2012, pp. 641-648, http://www.elsevier.com/locate/satrans, Elsevier; 2012.
Saeed R. A. et al., "3D fluid-structure modeling and vibration analysis for fault diagnosis of Francis turbine using multiple ANN and multiple ANFIS", Mechanical Signal and Signal Processing No. 34, 2013, pp. 259-276, Elsevier; 2012.
Xiaobo Liu et al., "The fuzzy expert system for fault diagnosis of hydro generator set", Journal of Huazhong University of Science and Technology (Natural Science Edition), vol. 34, No. 1, pp. 71-73; 2006.
Zhu Xiaoxing et al., "Intelligent parameter identification of steam turbine and its governing systems based on multi-algorithm", Power system protection and control, vol. 41, No. 20, Oct. 16, 2013, China Academic Journal Electronic Publishing House, pp. 138-143; 2013.
Japanese Office Action for related Japanese Application No. 2016-504518 dated Jul. 25, 2016, with English Translation.

(56) References Cited

OTHER PUBLICATIONS

Brafman et al, "R-max—a general polynomial time algorithm for near-optimal rein-forcement learning," Journal of Machine Learning Research, 3, 213-231, 2003.
German Office Action for related German Application No. 10 2013 205 356.8, dated Nov. 19, 2013, with English Translation.
Kearns et al, "Near-optimal reinforcement learning in polynomial time," in Proceedings of the 15th International Conference on Machine Learning, pp. 260-268, 1998.
PCT International Search Report and Written Opinion of the International Searching Authority dated May 28, 2014 for corresponding PCT/EP2014/051186.
Strehl et al, "An analysis of model-based interval estimation for markov decision processes.," Journal of Computer and System Sciences, 74(8), 1309-1331, 2008.

\* cited by examiner

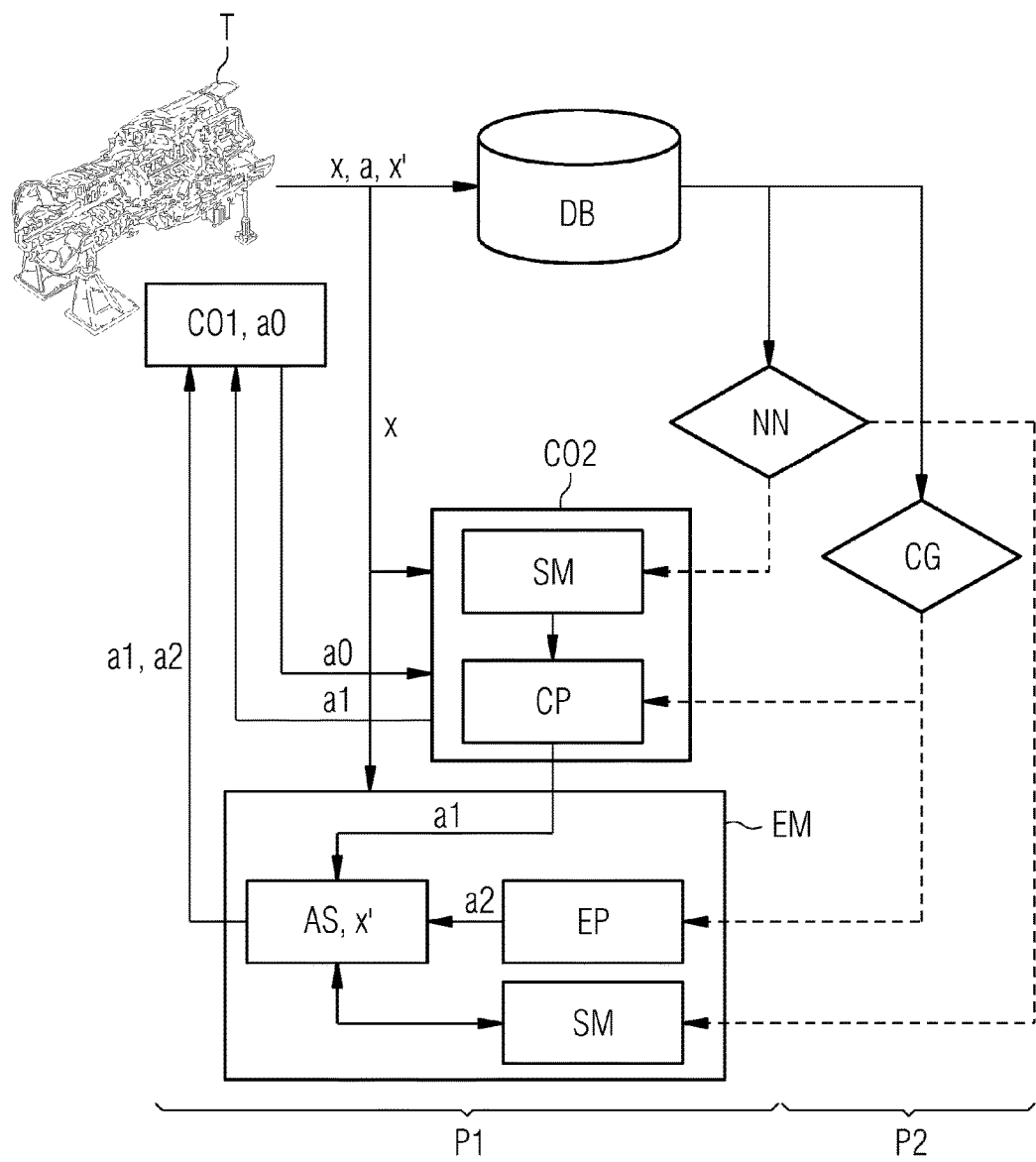

METHOD FOR THE COMPUTERIZED CONTROL AND/OR REGULATION OF A TECHNICAL SYSTEM

This application is the National Stage of International Application No. PCT/EP2014/051186, filed Jan. 22, 2014, which claims the benefit of German Patent Application No. DE 10 2013 205 356.8, filed Mar. 26, 2013. The entire contents of these documents are hereby incorporated herein by reference.

BACKGROUND

The present embodiments relate to computer-assisted open-loop and/or closed-loop control of a technical system.

Various computer-assisted methods for performing open-loop and/or closed-loop control of technical systems are known from the prior art. These methods specify, for a current state of the technical system, which action is to be carried out on the technical system. A state is described here by a number of state variables, and an action is described by a number of action variables. In addition to simple table-based regulators that assign corresponding actions to states of the technical system by a table, there are also regulators having an action selection rule that has been learnt with a machine learning method (e.g., based on a recurrent neural network). An application case of such regulators is gas turbines in order to optimize parameters of the turbine such as the efficiency, combustion chamber dynamics, emissions of pollutants. A further application case of these regulators is the control of a wind turbine. In this case, for example, the wear and the efficiency are optimized.

In order to implement machine-learnt action selection rules, training data is provided. The training data specifies corresponding subsequent states for a number of states and actions that are carried out in these states. In order to generate new training data, the technical system is to be operated in still unknown states. However, these new states are to not disrupt or severely impair the operation of the technical system and, for example, do not bring about malfunctions of the technical system.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for performing open-loop and/or closed-loop control of a technical system with which new states of the technical system may be explored without the operation of the technical system being adversely affected is provided.

The method according to one or more of the present embodiments serves to perform open-loop and/or closed-loop control of a technical system. The open-loop control or closed-loop control carries out, at respective times, actions including one or more action variables on the technical system as a function of one or more states of the technical system, including in each case one or more state variables.

Within the scope of the method according to one or more of the present embodiments, in act a) a predefined regulating method determines, at respective times, first actions that are to be carried out on the technical system as a function of at least the state of the technical system at the respective time (e.g., if appropriate, also as a function of states at earlier times).

According to act b), at least one exploration rule determines one or more second actions to be carried out on the technical system, as a function of at least the state of the technical system at the respective time. In the case of a plurality of exploration rules, each exploration rule determines a second action separately. The exploration rules may be defined as desired, and examples of such rules are given below. According to the exploration rule, second actions with which states of the technical system are entered, are defined according to specific criteria.

In act c), a set of resulting subsequent states of the technical system is predicted based on a simulation model of the technical system for each second action. Such simulation models are known from the prior art. The term set of subsequent states is to be understood broadly and may, if appropriate, also include just one subsequent state at a time that directly follows the respective (current) time. However, the set of subsequent states may include a plurality of future subsequent states. For example, the subsequent states for a predefined future time interval may be predicted with the simulation model.

In act d), it is checked for each set of the subsequent states predicted in act c) whether the respective set of subsequent states satisfies a predefined threshold value criterion that defines thresholds that are to be complied with for at least one portion of the state variables of the respective set of subsequent states.

If in act e) one or more sets of subsequent states satisfy the threshold value criterion, a second action is supplied to the predefined regulating method, for which action the predicted set of subsequent states satisfies the threshold value criterion. If there are a plurality of such second actions, corresponding criteria, with which it is specified which of these second actions are supplied to the regulating method, may be defined. If the emphasis is on the exploration of the state space, such second actions having subsequent states that are close to the corresponding thresholds may be supplied to the regulating method. If the emphasis is on the safety of the operation of the technical system, such second actions with subsequent states that are far away from corresponding thresholds of the threshold value criterion are instead fed to the regulating method. The predefined regulating method carries out, as an action, on the technical system the supplied second action instead of the first action or the first action, determined in act a), in combination with the second action.

The method according to one or more of the present embodiments permits the implementation of an exploration rule in the closed-loop-controlled or open-loop-controlled operation of a technical system. It is provided, through the definition of corresponding threshold values for state variables of subsequent states that are predicted by a simulation model, that the operation of the technical system is not adversely affected, and therefore, new states are entered imperceptibly within the scope of the operation of the technical system. New training data is generated based on the new states with the actions carried out in these states and the subsequent states, which may be used at a later time for machine learning of simulation methods or regulating methods. During the operation of the technical system, the actions that are carried out in act e) are accordingly stored and/or output in combination with the corresponding state and the subsequent state that occurs in reality.

Depending on the refinement, it is possible, in the event of none of the sets of subsequent states in act e) satisfying the threshold value criterion, to initiate certain measures. In one case, the predefined regulating method carries out the first action determined in act a). One or more modified actions for which the acts c) to e) described above are executed may be determined. The criterion as to how modified second actions are determined may be defined as desired. For example, a percentage with which a second action that is originally determined in step b) is modified may be specified. In a further variant, the acts b) to e) of the method are executed once more. This is appropriate, for example, when the exploration rule is random, and the same second action is not always determined for the same state or if different exploration rules are used during the repeated execution of acts b) to e).

In one embodiment, the second actions that are determined in act b) constitute a variation of the first actions that are determined in act a). In this context, in act e), the first action that is varied by the variation of the supplied second action is carried out as an action on the technical system. The exploration of the state space is thus realized in the manner of an offset regulating process that, if appropriate, changes corresponding first actions. Nevertheless, there is also the possibility of the second action being defined such that the second action replaces the first action when the second action is used.

In a further refinement of the method according to one or more of the present embodiments, the threshold value criterion specifies, for at least a portion of the state variables of the subsequent states, respective value ranges within which the values of these state variables are to lie. The value ranges may be defined in absolute terms here but, if appropriate, may also depend on the values of the state variables of the subsequent states and, for example, define a percentage deviation from these values.

As already mentioned above, the at least one exploration rule may be defined differently depending on the refinement of the method. For example, the at least one exploration rule may include one or more of the following rules: a rule that randomly selects the second action; a rule that is based on expert knowledge; and an ε greedy rule. The exploration rules that are described in documents [1] to [3] may be used. In a further refinement of the method, the simulation model is learnt with a machine learning method and is based, for example, on a learnt neural network (e.g., a recurrent neural network). Such simulation models are sufficient known from the prior art (see, for example, document [4]).

The predefined regulating method that is used within the scope of one or more of the present embodiments may be configured as desired. For example, regulating methods that are known per se are used here. The predefined regulating method may be one of the following methods: a table-based regulating method in which respective states of the technical system are assigned to first actions by a table; an action selection rule that is learnt with a machine learning method (e.g., based on the method in document [4]); a combination of a table-based regulating method and an action selection rule that is learnt with a machine learning method, where the action selection rule may specify a variation of an action that is determined with the table-based regulating method, and the first action may be the action of the table-based regulating method that is varied by the variation.

The method according to one or more of the present embodiments is suitable, for example, for performing open-loop or closed-loop control of a gas turbine and/or wind turbine. In this context, a state of the gas turbine may include one or more of the following state variables: the temperature and/or the pressure at one or more locations on the gas turbine (e.g., the ambient temperature and/or the ambient pressure and/or the compressor temperature and/or the compressor pressure and/or the temperature in the combustion chamber and/or the pressure in the combustion chamber); the air humidity at one or more locations on the gas turbine; the combustion chamber accelerations in the gas turbine; the emission of pollutants by the gas turbine (e.g., the emission of nitrogen oxide); and the power generated by the gas turbine.

In the case of a gas turbine, the action variable or action variables of the first and/or second actions to be carried out at the gas turbine may include a change in the setting of one or more fuel injection valves and/or a change in the position of one or more vanes (e.g., inlet guide vanes) and/or a change in one or more cooling air streams in gas turbines.

In order to provide undisrupted operation of a gas turbine within the scope of the exploration of the state space, the state variable or state variables in act d) for which thresholds that are to be complied with are defined may be the combustion chamber accelerations in the gas turbine and/or the emission of pollutants by the gas turbine.

In the case of a technical system in the form of a wind turbine, a state of the wind turbine may include one or more of the following state variables: the temperature and/or the pressure and/or the air humidity at one or more locations on the wind turbine (e.g., the ambient temperature and/or the ambient pressure and/or the ambient air humidity); the strength of the wind at the wind turbine; the amplitude of the oscillations of the tower of the wind turbine; the mechanical loading of the rotor blades of the wind turbine; and the power generated by the wind turbine.

In the case of a wind turbine, the action variable or action variables of the first and/or second actions to be carried out at the wind turbine include a change in the angles of attack of the rotor blades of the rotor of the wind turbine and/or a change in the orientation of the rotor of the wind turbine with respect to the wind.

Undisrupted operation of the wind turbine within the scope of the method according to one or more of the present embodiments is provided, for example, if the state variable or state variables in act d), for which thresholds that are to be complied with are defined, include the amplitude of the oscillations of the tower of the wind turbine and/or the mechanical loading of the rotor blades of the wind turbine.

In addition to the method described above, one or more of the present embodiments also relate to a computer program product having a program that is stored on a machine-readable carrier (e.g., a non-transitory computer-readable storage medium), for executing the method according to one or more of the present embodiments or one or more variants of the method according to one or more of the present embodiments when the program runs on a computer.

BRIEF DESCRIPTION OF THE DRAWINGS

FIG. 1 shows a schematic illustration of the sequence of an embodiment of the method.

DETAILED DESCRIPTION

One or more of the present embodiments are explained according to FIG. 1 with reference to the control of a technical system T in the form of a gas turbine. In the left-hand part P1 of FIG. 1, an embodiment of the regulating method that is executed online during the operation of the gas turbine is represented. In contrast, in the right-hand part P2 of FIG. 1, method acts with which parts of the method in the section P1 are generated are represented. The method acts in the section P2 are executed offline here (e.g., not during the operation of the technical system) and constitute in this sense preparatory steps for the implementation of the method according to one or more of the present embodiments on a gas turbine.

The control method of the turbine in the section P1 includes a conventional regulating method based on a first regulator CO1 and a second regulator CO2. The first regulator CO1 is realized in a manner known as a table-based regulator and outputs, for a state x of the gas turbine at the current time, an action a0 that is to be carried out at the turbine. In this context, the actions that are to be carried out for corresponding states are stored in the table for the states. The second regulator CO2 is realized in the form of a learnt action selection rule. The states of the gas turbine include, for example, one or more of the state variables, described above, of a turbine, and the actions relate to the changes in one or more actuation variables of the gas turbine. These actuation variables may be the change in the setting of fuel ratios by one of more fuel injection valves, and the change in position of vanes in the gas turbine and, for example, of inlet guide vanes, as has also been described above.

According to FIG. 1, the regulator CO1 therefore determines an action a0 based on the current state x of the gas turbine by accessing a table. The current state x and the action a0 are supplied to the regulator CO2 in the form of a learnt action selection rule. This rule includes a simulation model SM of the gas turbine that models the dynamic behavior of the turbine. This simulation model interacts with a control rule CP that determines an optimum first action a1 as a function of the current state x of the gas turbine by taking into account the action a0. The degree to which an action is optimum is based on a suitable reward function. The simulation model SM was previously learnt by a neural network NN that accesses a database DB in which training data in the form of states x previously assumed by the technical system, actions a carried out in these states, and resulting subsequent states x' are stored. The control rule CP was generated by a control generator CG that accesses the training data from the database DB.

The regulator CO2 therefore outputs, as a function of a current action x, an action a1 that is to be executed on the technical system. Such types of regulators are known from the prior art and are therefore not described in detail. For example, the regulator CO2 may be based on a recurrent neural network, as is described, for example, in document [4] below. In the embodiment of the regulator described, the regulator is realized as an offset regulator that specifies an offset or a variation that is added to the action a0. As a result of this, the first action a1 is obtained.

Conventionally, this action a1 is supplied to the regulator CO1, which then carries out this action as action a on the technical system. The states x that are assumed by the gas turbine and the actions a that are carried out in these states, with resulting subsequent states x', are stored in the database DB, which has already been mentioned above and which may be used to learn the neural network NN or the control generator CG.

Within the scope of the method according to one or more of the present embodiments, an exploration module EM is provided as a further module. The exploration module EM may be connected as required and therefore used within the scope of the regulation of the gas turbine. When the exploration module is connected, the first action a1 is no longer supplied directly to the regulator CO1 but instead is transferred to the exploration module EM and to the action selection module AS there. In addition, the exploration module receives the current state x of the gas turbine. The exploration module EM serves to explore the space of the states of the gas turbine (e.g., to search for states that have not been assumed by the gas turbine). Since this module is used during the ongoing operation of the technical system, the exploration of new states is to occur in an imperceptible way.

The new states are to be selected such that the operation of the gas turbine is not perceptively impaired. For example, the emissions of pollutants and/or the combustion chamber accelerations and therefore the humming of the combustion chamber should not increase too much.

An exploration rule EP that may be defined differently depending on the refinement is stored in the exploration module EM. The exploration rule specifies here, based on the current state x of the gas turbine, a second action a2, which is in turn an offset or a variation that is added to the first action a1 in the event of the exploration rule being applied. The exploration rule may be realized in different ways depending on the application case. For example, the exploration rule may randomly determine a second action a2 based on the current state x. The exploration rule may be defined based on the methods in documents [1] to [3] below or may be an $\varepsilon$ greedy exploration, which is known. The exploration rule may, if appropriate, be defined by expert knowledge.

The second action a2, which is determined with the exploration rule, is supplied to the action selection module AS, which interacts with a simulation model SM of the gas turbine. This simulation model corresponds to the simulation model of the regulator CO2 and was determined by the learning of the neural network NN. In the action selection module AS, the simulation model SM determines which subsequent states x' of the technical system the application of the action a1 varied with the action a2 will lead to. In this context, the subsequent states are considered for a predetermined future time interval.

In the action selection module AS, predetermined value ranges for specific state variables of the subsequent states of the gas turbine are stored. For example, in this context, an upper threshold value for the humming of the combustion chamber and/or the emissions of nitrogen oxide are stored. If this threshold value of the state variables is exceeded by at least one of the subsequent states, the second action a2 is not permissible. In this case, the originally determined action a1 is transmitted by the action selection module to the regulator CO1, which then carries out this action. If, in contrast, the corresponding threshold values of the state variables of the subsequent states are not exceeded, the second action a2, which is determined by the exploration rule EP, is fed to the regulator CO1 in addition to the action a1. The regulator then carries out the sum of the two actions. In this way, it is provided that exploration of the state space of the gas turbine to the extent of new states is carried out only when specific limiting values of the emission of pollutants and of the humming of the combustion chamber are not exceeded. This results in the operation of the gas turbine not being adversely affected by the exploration. The exploration therefore takes place in an imperceptible way and is not perceived by the operator of the gas turbine.

In modifications of the method described above, if appropriate, a plurality of exploration rules EP may also be stored in the exploration module EM. In this context, a plurality of second actions a2 are determined by the exploration modules, and subsequently, all the second actions having subsequent states that lie within the corresponding limiting values of the state variables are determined. An action is then selected from these second actions in accordance with a predetermined criterion. This may be, for example, the action that gives rise to subsequent states having state variables that are furthest away from the threshold values if the priority is placed on safe operation of the technical system. If, in contrast, the priority is placed on good exploration of the state space, that second action a2, which gives rise to subsequent states having state that variables are closest to the corresponding threshold values, may also be used.

The exploration module EM may, if appropriate, also be used in a regulating method that uses only the table-based regulator CO1. In this case, the first action corresponds to the action a0 that is sent to the exploration module EM and processed there in a way analogous to that described above.

The embodiment of the method according to one or more of the present embodiments that is described above has a series of advantages. For example, exploration of the state space of the technical system to the extent of new states is also achieved imperceptibly within the scope of regulated operation of a technical system. These new states together with the actions carried out therein, and the subsequent states therefore extend the set of data relating to the technical system. The data may be used as training data in corresponding methods for learning simulation models or action selection rules of the technical system. Within the scope of the exploration, the exploration does not give rise to undesired operating states of the technical system that, under certain circumstances, trigger warnings or alarms. Instead, the exploration is configured by defining corresponding threshold values such that the exploration takes place imperceptibly and does not adversely affect the operation of the technical system.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

LIST OF REFERENCES

[1] Michael Kearns and Satinder Singh, "Near-optimal reinforcement learning in polynomial time", in Proceedings of the 15th International Conference on Machine Learning, pp. 260-268 (1998).
[2] Ronen I. Brafman and Moshe Tennenholtz, "R-max—a general polynomial time algorithm for near-optimal reinforcement learning", Journal of Machine Learning Research, 3, 213-231, (2003).
[3] Alexander L, Strehl and Michael L. Littman, "An analysis of model-based interval estimation for markov decision processes.", Journal of Computer and System Sciences, 74(8), 1309-1331, (2008).
[4] DE 10 2007 001 025 A1

The invention claimed is:
1. A method for computer-assisted open-loop control, closed-loop control, or open-loop and closed-loop control of a technical system, wherein the open-loop control, the closed-loop control, or the open-loop and closed-loop control carries out, at respective times, actions comprising one or more action variables at the technical system as a function of one or more states of the technical system, comprising in each case one or more state variables, the method comprising:

determining, by a predefined regulating method, at respective times, first actions that are to be carried out on the technical system as a function of at least the state of the technical system at the respective time;

determining, by at least one exploration rule, one or more second actions to be carried out on the technical system as a function of at least the state of the technical system at the respective time, the at least one exploration rule configured to determine the one or more second actions to be carried out to explore states that have not been adopted by the technical system;

predicting a set of resulting subsequent states of the technical system based on a simulation model of the technical system for each second action;

checking, for each set of subsequent states, whether the respective set of subsequent states satisfies a predefined threshold value criterion that defines thresholds to be complied with for at least one portion of the state variables of the respective set of subsequent states; and supplying a second action to the predefined regulating method when one or more sets of subsequent states satisfy the threshold value criterion, wherein for the second action, the predicted set of subsequent states satisfying the threshold value criterion, wherein after supplying the second action, the predefined regulating method is configured to carry out the supplied second action instead of the first action, or to carry out the first action in combination with the second action, the technical system, wherein in an event of none of the sets of subsequent states satisfy the threshold value criterion, the predefined regulating method carries out the first action, one or more modified second actions are determined, or the predefined regulating method carries out the first action and one or more modified second actions are determined, wherein, for the one or more modified second actions, the method further comprises: predicting a set of resulting modified subsequent states of the technical system based on a simulation model of the technical system for each modified second action;

checking, for each set of modified subsequent states, whether the respective set of modified subsequent states satisfies a predefined threshold value criterion that defines thresholds to be complied with for at least one portion of the state variables of the respective set of modified subsequent states;

supplying a modified second action to the predefined regulating method when one or more sets of modified subsequent states satisfy the threshold value criterion, wherein for the modified second action, the predicted set of modified subsequent states satisfying the threshold value criterion, wherein after supplying the modified second action, the predefined regulating method carries out the supplied modified second action instead of the first action, or carries out the first action in combination with the modified second action, at the technical system.

2. The method of claim 1, wherein each of the one or more determined second actions constitutes a variation of the first action, and
wherein the supplied second action is carried out at the technical system.

3. The method of claim 1, wherein the threshold value criterion specifies, for at least a portion of the state variables of the subsequent states, respective value ranges within which values of the portion of the state variables must lie.

4. The method of claim 3, wherein the value ranges depend on the values of the state variables of the subsequent states and define a percentage deviation from the values.

5. The method of claim 1, wherein the at least one exploration rule comprises a rule that randomly selects the second action, a rule that is based on expert knowledge, an ε greedy rule, or any combination thereof.

6. The method of claim 1, wherein the simulation model is learnt with a machine learning method and is based on a learnt neural network.

7. The method of claim 1, wherein the predefined regulating method is a table-based regulating method in which respective states of the technical system are assigned to first actions by a table, an action selection rule that is learnt with a machine learning method, or a combination of a table-based regulating method and an action selection rule that is learnt with a machine learning method, and
wherein the action selection rule specifies a variation of an action that is determined with the table-based regulating method, and the first action is that action of the table-based regulating method that is varied by the variation.

8. The method of claim 1, wherein the technical system is a gas turbine, a wind turbine, or the gas turbine and the wind turbine.

9. The method of claim 8, wherein the technical system comprises the gas turbine or the gas turbine and the wind turbine, and
wherein a state of the gas turbine comprises one or more state variables, the one or more state variables comprising a temperature, a pressure, or the temperature and the pressure at one or more locations on the gas turbine, an air humidity at one or more locations on the gas turbine, combustion chamber accelerations in the gas turbine, emission of pollutants by the gas turbine, power generated by the gas turbine, or any combination thereof.

10. The method of claim 8, wherein the one or more action variables of the first actions, the second actions, or the first actions and the second actions to be carried out at the gas turbine comprise a change in a setting of one or more fuel injection valves, a change in a position of one or more vanes, a change in one or more cooling air streams in the gas turbine, or any combination thereof.

11. The method of claim 9, wherein the portion of state variables in the checking, for which thresholds that are to be complied with are defined, comprise the combustion chamber accelerations in the gas turbine, the emission of pollutants by the gas turbine, or a combination thereof.

12. The method of claim 8, wherein the technical system comprises the wind turbine or the gas turbine and the wind turbine, and
wherein a state of the wind turbine comprises one or more state variables, the one or more state variables comprising a temperature, a pressure, an air humidity, or any combination thereof at one or more locations on the wind turbine, a strength of wind at the wind turbine, an amplitude of oscillations of a tower of the wind turbine, mechanical loading of rotor blades of the wind turbine, power generated by the wind turbine, or any combination thereof.

13. The method of claim 8, wherein the technical system comprises the wind turbine or the gas turbine and the wind turbine, and
wherein the one or more action variables of the first actions, the second actions, or the first actions and the second actions to be carried out at the wind turbine comprise a change in angles of attack of rotor blades of a rotor of the wind turbine, a change in orientation of the rotor of the wind turbine with respect to the wind, or a combination thereof.

14. The method of claim 12, wherein the at least one portion of state variables in the checking, for which thresholds that are to be complied with are defined, comprise the amplitude of the oscillations of the tower of the wind turbine, the mechanical loading of the rotor blades of the wind turbine, or a combination thereof.

15. The method of claim 6, wherein the learnt neural network is a recurrent neural network.

16. The method of claim 9, wherein the temperature, the pressure, or the temperature and the pressure at one or more locations on the gas turbine comprises an ambient temperature, an ambient pressure, a compressor temperature, a compressor pressure, a temperature in a combustion chamber, a pressure in the combustion chamber, or any combination thereof.

17. The method of claim 8, wherein the emission of pollutants by the gas turbine comprises emission of nitrogen oxide.

18. The method of claim 12, wherein the temperature, the pressure, the air humidity, or any combination thereof at the one or more locations on the wind turbine comprises an ambient temperature, an ambient pressure, an ambient air humidity, or any combination thereof.

19. A computer program product having a program with instructions that are stored on a non-transitory machine-readable carrier for computer-assisted open-loop control, closed-loop control, or open-loop and closed-loop control of a technical system, when the program runs on a computer, wherein the open-loop control, the closed-loop control, or the open-loop and closed-loop control carries out, at respective times, actions comprising one or more action variables at the technical system as a function of one or more states of the technical system, comprising in each case one or more state variables, the instructions comprising:
determining, by a predefined regulating method, at respective times, first actions that are to be carried out on the technical system as a function of at least the state of the technical system at the respective time;
determining, by at least one exploration rule, one or more second actions to be carried out on the technical system as a function of at least the state of the technical system at the respective time, the at least one exploration rule configured to determine the one or more second actions to be carried out to explore states that have not been adopted by the technical system;
predicting a set of resulting subsequent states of the technical system based on a simulation model of the technical system for each second action;
checking, for each set of subsequent states, whether the respective set of subsequent states satisfies a predefined threshold value criterion that defines thresholds to be complied with for at least one portion of the state variables of the respective set of subsequent states; and supplying a second action to the predefined regulating method when one or more sets of subsequent states satisfy the threshold value criterion, wherein for the second action, the predicted set of subsequent states satisfying the threshold value criterion, wherein after supplying the second action, the predefined regulating method is configured to carry out the supplied second action instead of the first action, or to carry out the first action in combination with the second action, at the technical system, wherein in an event of none of the sets of subsequent states satisfy the threshold value criterion, the predefined regulating method carries out the first action, one or more modified second actions are determined, or the predefined regulating method carries out the first action and one or more modified second actions are determined, wherein, for the one or more modified second actions, the method further comprises:

predicting a set of resulting modified subsequent states of the technical system based on a simulation model of the technical system for each modified second action;

checking, for each set of modified subsequent states, whether the respective set of modified subsequent states satisfies a predefined threshold value criterion that defines thresholds to be complied with for at least one portion of the state variables of the respective set of modified subsequent states;

supplying a modified second action to the predefined regulating method when one or more sets of modified subsequent states satisfy the threshold value criterion, wherein for the modified second action, the predicted set of modified subsequent states satisfying the threshold value criterion, wherein after supplying the modified second action, the predefined regulating method carries out the supplied modified second action instead of the first action, or carries out the first action in combination with the modified second action, at the technical system.

* * * * *